United States Patent [19]
Paul et al.

[11] Patent Number: 5,501,919
[45] Date of Patent: Mar. 26, 1996

[54] SOLID ION CONDUCTING MATERIAL, OBTAINED FROM A POLYMER AND AN ALKALINE CATION SALT, WITH APPLICATION AS AN ELECTROLYTE

[75] Inventors: Jean-Luc Paul, Bordeaux; Jean-Claude Lassegues, Pessac, both of France

[73] Assignee: Saint-Gobain Vitrage International, Courbevoie, France

[21] Appl. No.: 196,793

[22] Filed: Feb. 15, 1994

Related U.S. Application Data

[63] Continuation of Ser. No. 898,534, Jun. 15, 1992, abandoned.

[30] Foreign Application Priority Data

Jun. 14, 1991 [FR] France .................................. 91 07283

[51] Int. Cl.$^6$ ........................................................ H01M 6/18
[52] U.S. Cl. ............................................. 429/192; 252/622
[58] Field of Search ............................ 429/192; 252/62.2

[56] References Cited

U.S. PATENT DOCUMENTS 4,576,882  3/1986  Davis et al. .
4,730,239  3/1988  Currie et al. .
5,011,751  4/1991  Yoneyama et al. ...................... 429/192

OTHER PUBLICATIONS

Macromolecules, vol. 20, 1987, Easton US, pp. 1778–1781, Harris et al, "Ionic Conductivity in Branched Polyethylenimine–Sodium Trifluoromethanesulfonate Complexes. Comparisons to Analogous Complexes made with Linear Polyethylenimine".

*Primary Examiner*—José G. Dees
*Assistant Examiner*—Samuel Barts
*Attorney, Agent, or Firm*—Oblon, Spivak, McClelland, Maier, & Neustadt

[57] ABSTRACT

A solid ion conductor material is made from branched polyethylene imine and a lithium cation salt in such a manner that the ratio of the number of nitrogen atoms contained in the polymer to the number of lithium cations originating from the salt is optimized. The branched polyethylene imine can be plasticized within a certain proportionate range of plasticizer. This type of material is used as electrolyte, notably in electrochromic systems.

15 Claims, 3 Drawing Sheets

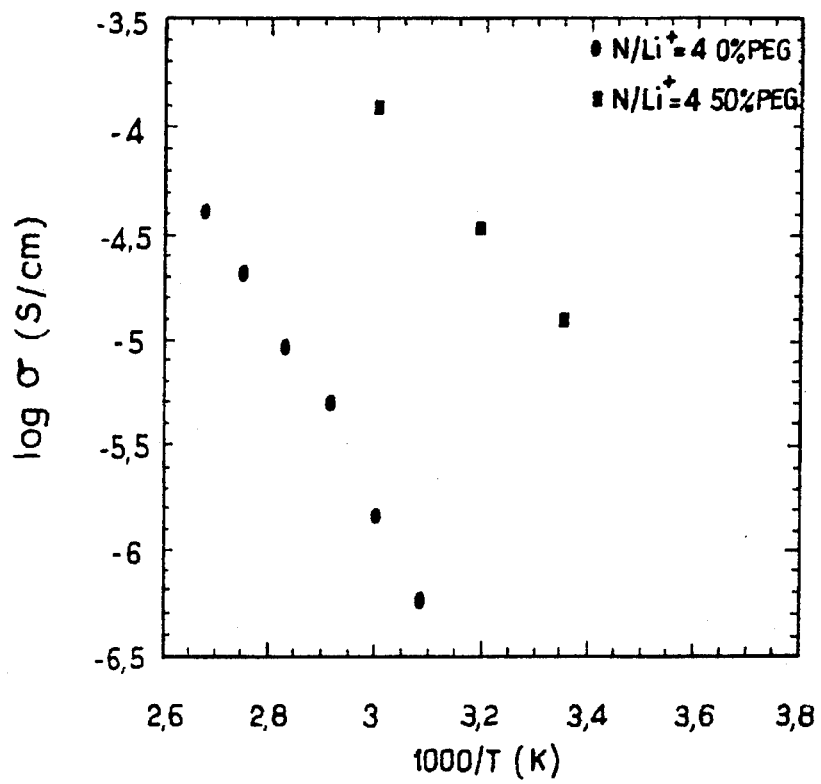
FIG_3
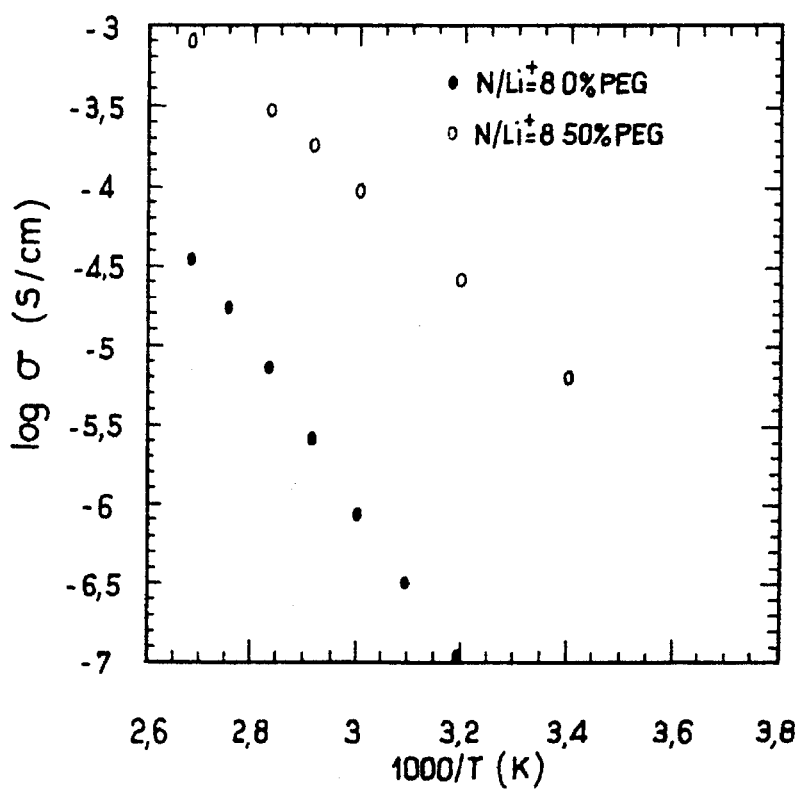
FIG_4

SOLID ION CONDUCTING MATERIAL, OBTAINED FROM A POLYMER AND AN ALKALINE CATION SALT, WITH APPLICATION AS AN ELECTROLYTE

This application is a Continuation of application Ser. No. 07/898,534, filed on Jun. 15, 1992, now abandoned.

BACKGROUND OF THE INVENTION

1. Field of the Invention

This invention relates to solid ion conducting materials, capable of being used as electrolytes.

More specifically, it relates to materials made from solid solutions of polymers and of alkali metal salts, such as lithium salts, possessing a sufficient ion conductivity for them to be used as electrolyte in electrochromic glass panes, that is in panes in which the light transmission can be modified by the action of a potential difference as a result of the presence of a film of an electrochromic material, such as tungsten oxide ($WO_3$), having the particular feature of changing color under the effect of a reversible insertion of cations.

2. Discussion of the Background

It is now well known to associate salts of alkali metals with a basic polymer matrix having heteroatoms like oxygen, such as polyethylene oxide (PEO) or nitrogen, such as polyethylene imine (PEI). The ion conduction of the material thus formed is obtained by dissociation of the salt, the cation being solvated by means of free electronic doublets of the polymer heteroatoms, the anion according to certain authors being solvated by the polymer via hydrogen bonds. (M. B. Armand, Annual Review of Materials Science, 1986, 16,245:261).

Until now, the majority of studies have been directed to electrolytes based on polyethylene oxide (PEO), which have the advantage of producing relatively high ion conductivities. Nevertheless, this criterion of ion conductivity is not the only one to be taken into account in the choice of a macromolecular material.

It is, for example, desirable for the polymer to be conductive at the operating temperatures envisaged, which in the case of an electrochromic system assumes good conductivity at ambient temperature. It is known that the polymers studied are conducting only if they have an amorphous structure, that is a disorganized structure, which is the one most suitable for dissociating and solvating the salt. Any initiation of crystallization causes the cohesion energy of the polymer to increase and has adverse effects upon the ion conductivity of the material.

Such an amorphous structure can only be obtained by operating at a temperature higher than the glass transition temperature Tg, which should therefore be as low as possible. Furthermore, in addition to amorphous structure, elastic behavior is helpful to ion conductivity because it favors the flexibility and mobility of the polymer segments. It also facilitates the use of the final material. It may be noted that this characteristic is difficult to obtain as the value of Tg varies as a function of the quantity of salt solvated in the polymer, and should therefore remain at a low level with the usual concentrations of added salt.

On the other hand, independently of the operating temperature, it is desirable for the polymer to possess, at ambient temperature, sufficient plasticity for it to be incorporated as a thin film with good bonding to the other layers of the system.

In the case of the PEO, an ion conductivity of $10^{-5}$ $ohm^{-1}.cm^{-1}$, a value usually considered to be the minimum to give the material an electrolyte function, is not obtained unless the material is raised to a temperature higher than 80° C., as taught in FR 2,442,514. However, although it may be possible to heat the material to temperatures above 80° C. for applications in electrochemical generators, the same is not generally true in the case of electrochromic glass panes, where the other films of the system may be damaged. To subject a polymer film to such high temperatures can lead to accelerated aging and degradation of its mechanical properties.

In the case of PEI, it has been proposed (C. S. Harris, Macromolecules, 1987, 20:1778–1781), for the purpose of improving the amorphous and flexible character of the polyethylene imine (PEI), to not use linear PEI, but branched PEI (BPEI), the latter having a certain relative proportion of primary, secondary and tertiary nitrogen atoms. However, in order to achieve conductivity values higher than or equal to $10^{-5}$ $ohm^{-1}.cm^{-1}$, it is necessary to raise this polymer to 90° C., a temperature which a priori is too high both for the polymer itself and for the other films of the electrochromic system. Furthermore, the investigation was limited to the cation $Na^+$, whereas in the present state of the art the electrochromic systems are based upon the reversible insertion, by certain materials, either of protons or of lithium cations ($Li^+$), and not of sodium cations ($Na^+$).

A need continues to exist for improved solid ion conducting materials capable of functioning as electrolytes.

SUMMARY OF THE INVENTION

Accordingly, one object of the present invention is to provide a solid ion conducting material which overcomes the deficiencies of the prior art materials described above.

A further object of the invention is to provide a solid ion conducting electrolyte which can be used in an electrochromic device or glazing.

These and other objects which will become apparent from the following specification have been achieved by the present solid ion conductor material containing a branched polyethylene imine polymer and a lithium salt, where the $N/Li^+$ ratio of the conductor material, i.e., the number of nitrogen atoms N contained in the polymer divided by the number of lithium cations $Li^+$ originating from the salt is a value in the range from 5–40.

BRIEF DESCRIPTION OF THE DRAWINGS

FIGS. 3–6 show the logarithm of the conductivity of Examples 7–12 plotted as a function of the factor $1000/T(°K)$ both with and without a polyethylene glycol (PEG) plasticizer.

DETAILED DESCRIPTION OF THE PREFERRED EMBODIMENTS

Figure 1:
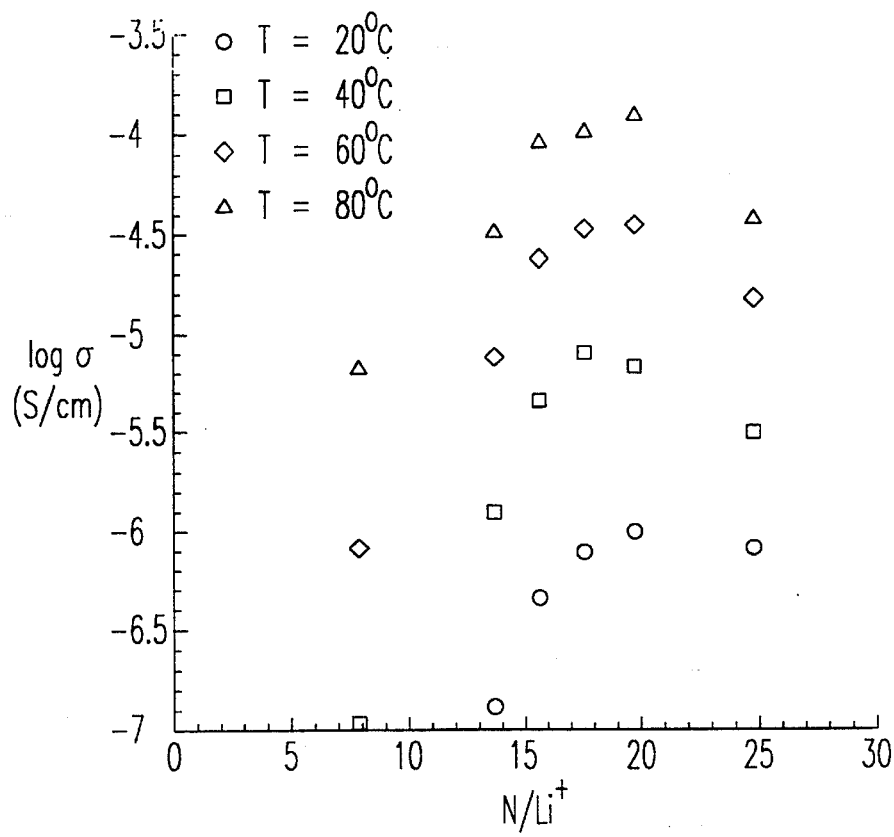
FIG. 1 shows the logarithm of the conductivity of the solid ion conducting material of the present invention plotted as a function of the ratio $N/Li^+$ at various temperatures for Examples 1–6.

In the present invention, a solid solution of a branched polyethylene imine (BPEI) polymer and an alkali metal salt, such as the lithium cation ($Li^+$) are associated, and the proportion of these two constituents is adjusted in such a way that the ratio N/Li$^+$ of the number of nitrogen atoms contained in the BPEI to the number of the Li$^+$ cations originating from the salt is from 5 to 40, preferably 16 to 25, more preferably from 18 to 22, and more especially approximately 20, for the purpose of obtaining an optimized ion conductivity. This number of nitrogen atoms N is, in fact, calculated from the average formula for the BPEI, that is to say (—CH$_2$—CH$_2$—NH), which amounts to saying that the ratio N/Li$^+$ corresponds to the average number of repeat units of the BPEI divided by the number of lithium cations.

The ion conductivity of the material thus produced is a function both of the salt concentration and of the temperature. The maximum conductivity of $10^{-6}$ ohm$^{-1}$.cm$^{-1}$ at 25° C. and $3.3 \times 10^{-5}$ ohm$^{-1}$.cm$^{-1}$ at 60° C. is reached, for a fairly low salt concentration, corresponding to the ratio N/Li$^+$ of approximately 20, the value of 60° C. being sufficiently moderate to be considered for an electrochromic system.

In other words, beyond a certain salt concentration, the number of charge carriers appears not only to become stationary but also to decrease, by the well-known phenomenon of formation of ion pairs or indeed multiplets.

It should also be noted that, as the examples that follow demonstrate, the Tg values of the BPEI alone and of the BPEI in the presence of the salt are very low, particularly for the ratio N/Li$^+$ of 20, which gives the material a clearly amorphous elastic character from ambient temperature upwards, a factor that is extremely favorable for the intended application.

One embodiment of the invention, which enables the Tg value to be decreased still further and the ion conductivity of the material to be very noticeably increased, consists of adding to the two foregoing constituents, that is to say to the BPEI and to the lithium salt, a plasticizer for the BPEI. Any conventional plasticizer for this category of polymer is within the scope of the invention.

Preferred plasticizers are oxygen-containing compounds which are capable of solvating the lithium cations originating from the lithium salt. Suitable oxygen-containing plasticizers include oligomers and polymers having regular repeating ether units. Such plasticizers include polyalkylene glycols prepared from C$_{2-4}$ alkylene glycols. Satisfactory results are obtained with polyethylene glycol (PEG) having a molecular weight of less than 600 and preferably of approximately 400.

In a very advantageous manner, the addition of the plasticizer enables the salt concentration to be increased, to provide optimized N/Li$^+$ ratios of between 2 and 16, preferably 4 and 12, more preferably between 6 and 10 and especially approximately 8. It should be noted that these values have been chosen after optimization of the proportion of the plasticizer, and notably of the PEG, in relation to the BPEI. In the case of the PEG, this proportion is expressed as a percentage (% PEG) which corresponds to the ratio of the number of units (O—CH$_2$—CH$_2$) of the PEG to the total number of the units (O—CH$_2$—CH$_2$) of the PEG and (CH$_2$—CH$_2$—NH) of the BPEI. This percentage of PEG is preferably between 10 and 70%, more preferably from 20 to 60% and notably around 50%.

Thus, by optimizing both the N/Li$^+$ ratio to a value of about 8 and the proportion of PEG (% PEG) to about 50%, either very much higher conductivities are obtained, i.e. $10^{-4}$ ohm$^{-1}$.cm$^{-1}$ at 60° C., or more moderate conductivities are obtained, but now at ambient temperature, i.e. the material has a conductivity of $10^{-5}$ ohm$^{-1}$.cm$^{-1}$ at 25° C.

In this way the primary importance of the effect of a plasticizer upon the conductivity of the material has been demonstrated. This plasticizer could, in fact, act at two levels. While not being limited to any particular theory, it is believed that the plasticizer first of all fulfills its fundamental role by further lowering the Tg values and by favoring an improved dynamic motion of the chains of the BPEI, but it is also possible that the plasticizer acts directly by means of its oxygen atoms on the solvation of the Li$^+$ cations. This would explain why the material possesses an improved conductivity at very high concentrations of alkaline salt whereas, without the plasticizer, such concentrations are not favored because they to some extent exceed the solvation capacity of the polymer, there being a risk of the anions and cations of the salt agglomerating with one another in neutral and crystalline pairs or agglomerates.

This embodiment with a plasticizer greatly facilitates the working of the material in the form of thin films, and notably makes possible an improved bond of these films in a film stack of the electrochromic type.

The BPEI that is preferred within the scope of this invention has a molecular weight ranging between 50,000 and 60,000 and a ratio of the number of primary/secondary/tertiary nitrogen atoms ranging from 1/2/1 to 1/1.33/1.

Furthermore, the anion of the lithium salt is preferably chosen from among the following anions: the trifluoromethane sulfonate anion (CF$_3$SO$_3$), the perchlorate anion (ClO$_4$), the thiocyanate anion (SCN) and the tetrafluoroborate anion (BF$_4$).

The manner of preparation, the analysis and the results of various examples of the invention will now be described with the assistance of FIGS. 1 to 6, which enable the range and advantages of the invention to be demonstrated.

Examples 1 to 12 which follow relate, for the first six examples, to materials based upon BPEI and lithium salt LiCF$_3$SO$_3$ and, for the last six, to similar materials but in which the BPEI is plasticized by PEG. The general formula of the materials according to the entirety of these examples is therefore as follows: (1-y) BPEI, (x) LiCF$_3$SO$_3$, (y) PEG, where x designates the ratio N/Li$^+$, that is to say the number of Li$^+$ cations per average unit (—CH$_2$CH$_2$NH—) of the BPEI, and y characterizes the proportion of ether oxide units (—CH$_2$CH$_2$O—) constituting the PEG. Defined in this way, y has a value between 0 and 1.

The characteristics of the components used in the Examples are as follows:

Branched polyethylene imine (BPEI) was obtained from the Aldrich Company. It has an average molecular weight of between 50,000 and 60,000 at 50% by weight in water. It is a branched polymer, in which the proportion of primary, secondary and tertiary N atoms is estimated at 1/1.33/1 up to 1/2/1; its viscosity is very high. Amorphous at ambient temperature, it has a glass transition temperature (Tg) of −47° C. The ion conductivity of the pure polymer is approximately $10^{-9}$ ohm$^{-1}$.cm$^{-1}$.

Polyethylene glycol (PEG 400) was obtained from the Fluka Company. Its average molecular weight is from 380 to 420. With a melting point of from 1° to 5° C., it is liquid at 20° C. and its viscosity is 120 mPa.s.

Lithium trifluoromethane sulfonate (LiCF$_3$SO$_3$) is sold commercially by the Aldrich Company.

In all of the examples, the steps of the process for preparation of the materials are as follows.

First of all, each of the products mentioned above must be thoroughly dehydrated before mixing. The BPEI in aqueous solution and also the salt LiCF$_3$SO$_3$ are dehydrated under a vacuum of less than 10 mtorr, at 60° C., for the BPEI, and at 150° C. for the salt, for a period of 72 hours. The PEG is stored over molecular sieves (4 Å) for a minimum of one week before use, in order to reduce the water content to less than 200 ppm water.

The salt is then added to the pure BPEI in a glove box under an inert gas (argon) atmosphere. The quantity of salt is adjusted according to the concentration desired. A common solvent for the BPEI and salt (commercial methanol containing less than 300 ppm water) is added in a proportion of 15 cm$^3$ to about 5 g of product. The solution is stirred until total homogenization is achieved. At this stage, and for the plasticized mixtures (y=0), the PEG is added in ad hoc proportions and the solution is again stirred.

Finally, the mixtures are dehydrated by heating under vacuum (60° C. maximum under less than 10 mtorr pressure for 72 hours). The products are stored in a dry box under an inert gas (argon) atmosphere.

It should be stated that this technique in readily applicable to all of the usual lithium salts, where the polymer and the salt have a common solvent. Similarly, other plasticizers equivalent to the PEG may be incorporated into the BPEI.

Other features of the invention will become apparent in the course of the following descriptions of exemplary embodiments which are given for illustration of the invention and are not intended to be limiting thereof.

EXAMPLES

EXAMPLES 1 to 6

The first series of material examples was produced using BPEI and LiCF$_3$SO$_3$. The table below indicates, for each final material, the N/Li$^+$ ratio and the glass transition value Tg.

As an illustration of the preparation procedure generally described earlier; the material of Example 5 (N/Li$^+$ ratio is 20) was prepared by mixing 1.58 grams of LiCF$_3$SO$_3$ and approximately 15 cm$^3$ of methanol and added this mixture to 8.714 grams of dried BPEI.

| Examples | 1 | 2 | 3 | 4 | 5 | 6 | BPEI only |
|---|---|---|---|---|---|---|---|
| N/Li$^+$ | 8 | 14 | 16 | 18 | 20 | 25 | — |
| Tg (°C.) | −4.8 | −26.1 | −26.6 | −34.8 | — | −36.1 | −47 |

Although this table shows an increase in the value of Tg with an increase in the salt concentration; the Tg value nevertheless remains well below 0° C., even below −30° C. for Examples 4 and 6, which prove to be the best ion conductors.

Figure 2:
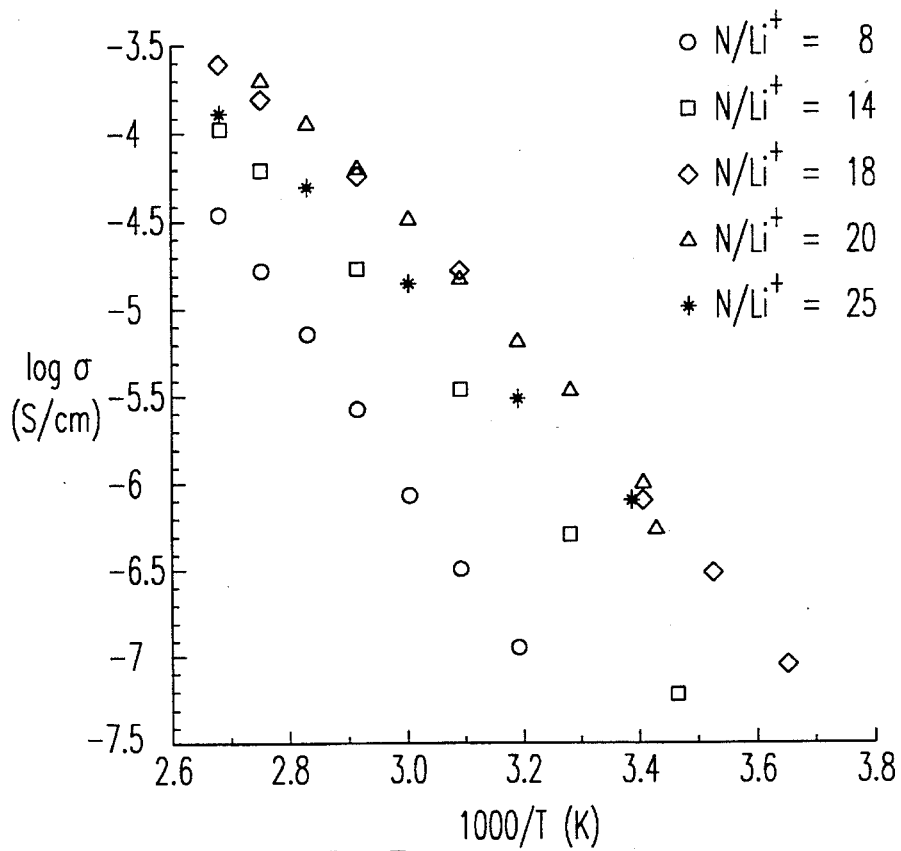
FIG. 2 shows the logarithm of the conductivity as a function of the factor $1000/T(°K)$ for each ratio $N/Li^+$ for Examples 1–6.

The conductivity of Examples 1 to 6 was then measured over a range of temperatures from 20° to 80° C. to give FIGS. 1 and 2. FIG. 1 shows the logarithm of the conductivity (ohm$^{-1}$.cm$^{-1}$) plotted as a function of the ratio N/Li$^+$ at various temperatures T (°C.), FIG. 2 showing the same logarithm as a function of the factor 1,000/T (°K) for each ratio N/Li$^+$.

The graph of FIG. 1 thus shows curves having an approximately Gaussian form, with an optimum N/Li$^+$ ratio for each temperature level. Thus, from 60° C., a conductivity greater than 10$^{-5}$ ohm$^{-1}$.cm$^{-1}$ is obtained with Examples 4, 5 and 6, which can be seen in a different form in the graph of FIG. 2. The best ion conductor is Example 5, which has an N/Li$^+$ ratio of 20, or a low salt concentration.

The infrared (IR) spectra of these six Examples show that, as the salt concentration increases, the vibration bands V(NH$_2$), V(CH$_2$) and V(C-N) of the BPEI, localized respectively at 3,400-3,300 cm$^{-1}$ 3,000-2,800 cm$^{-1}$ and 1,200-1,000 cm$^{-1}$ shift, the first two towards higher wavelength numbers and the last one towards lower wavelength numbers. This results from the modification to the lattice of the polymer, the chains of which are in interaction through the intermediary of hydrogen bonds NH . . . N. In fact, if there is added a lithium salt having the general formula Li$^+$X$^-$ which, when dissociating, creates new interactions of the type Li$^+$ . . . NH . . . X$^-$, the nitrogen atom is then subjected both to a loss of electronic density at the expense of the Li$^+$ cation and to an increase in this density arising from the solvation of the anion through the intermediary of hydrogen bonds. The former effect remains larger in absolute value than the latter for the following X$^-$ anions: SCN$^-$, CF$_3$SO$_3^-$, ClO$_4^-$.

In the IR spectra, the solvation of the lithium Li$^+$ can be seen, by a wide absorption band around 480 cm$^{-1}$.

For salt concentrations corresponding to N/Li$^+$ ratios of less than 10, a new absorption band appears around 450 cm$^{-1}$, attributable to the appearance of ion pairs and ion aggregates arising from the non-dissociated salt and therefore neutral, which reduce the ion conductivity of the whole.

EXAMPLES 7 to 12

A second series of materials was produced, which will now be compared with the first. This time, a plasticizer (PEG 400) was added to the BPEI and to the salt LiCF$_3$SO$_3$.

The table below shows, for each of the Examples, the N/Li$^+$ ratio which, in the present case, ranges from 4 to 20, and the proportion of PEG relative to the BPEI (% PEG).

For example, a material such as that of Example 7, having an N/Li$^+$ ratio of 4 and a % PEG of 50%, was obtained by adding, to 6.062 grams of dried BPEI polymer, 5.50 grams of LiCF$_3$SO$_3$ and approximately 15 cm$^3$ of methanol. The solution then contains 0.141 units of BPEI. Then, to 4 cm$^3$ of this solution, there were added 0.0376 units of PEG, or 1.733 grams, in order to finally obtain the desired proportion of 50% PEG.

| Examples | 7 | 8 | 9 | 10 | 11 | 12 |
|---|---|---|---|---|---|---|
| N/Li$^+$ | 4 | 8 | 12 | 12 | 20 | 20 |
| % PEG | 50% | 50% | 30% | 50% | 30% | 50% |

The graphs of FIGS. 3, 4, 5, 6 of show the logarithm of the conductivity in ohm$^{-1}$.cm$^{-1}$ of these materials plotted as a function of temperature, shown by 1,000/T(°K), in comparison with materials having the same N/Li$^+$ ratio, but without plasticizer, as in the first series of Examples.

Several conclusions may be drawn from a study of these graphs: first, from an inspection of the curve of the ion conductivity as a function solely of the ratio N/Li$^+$, it will be noted that, as in the case of the first series, there exists an optimum ratio, above and below which the conductivity falls. Here the maximum is situated at a ratio N/Li$^+$ of 8, corresponding to Example 8, that in to say to a concentration of lithium salt much higher than in the case of the first series.

In all cases, however, for a given ratio N/Li$^+$, the ion conductivity of the material is greatly improved when the BPEI is plasticized, which is very clearly apparent from the graphs of FIGS. 3 to 6, which show also the values of the conductivity of these same materials, but without any plasticizer (0% PEG).

Figure 5:
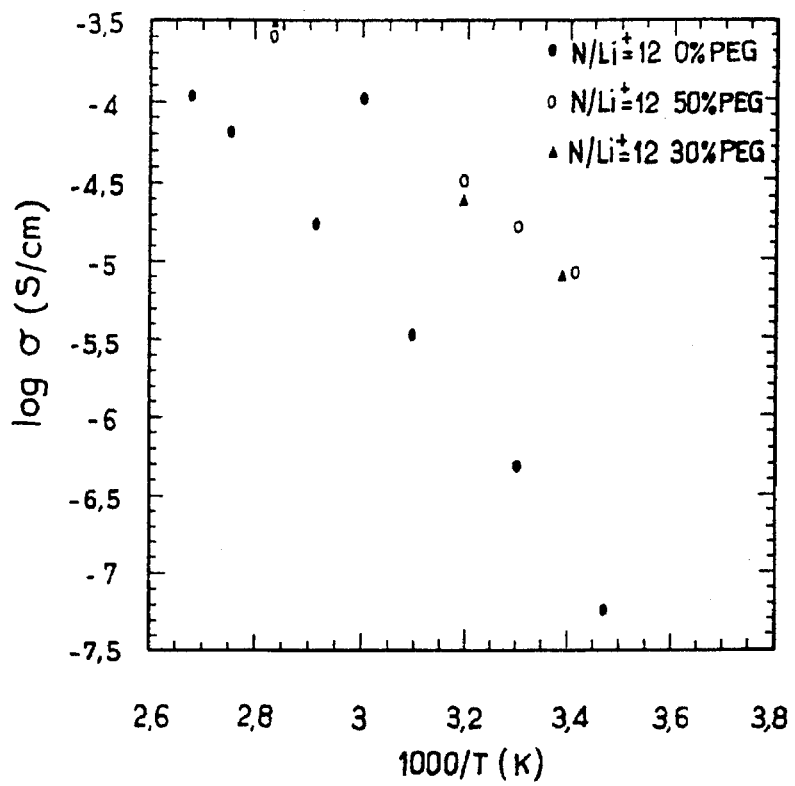
Figure 6:
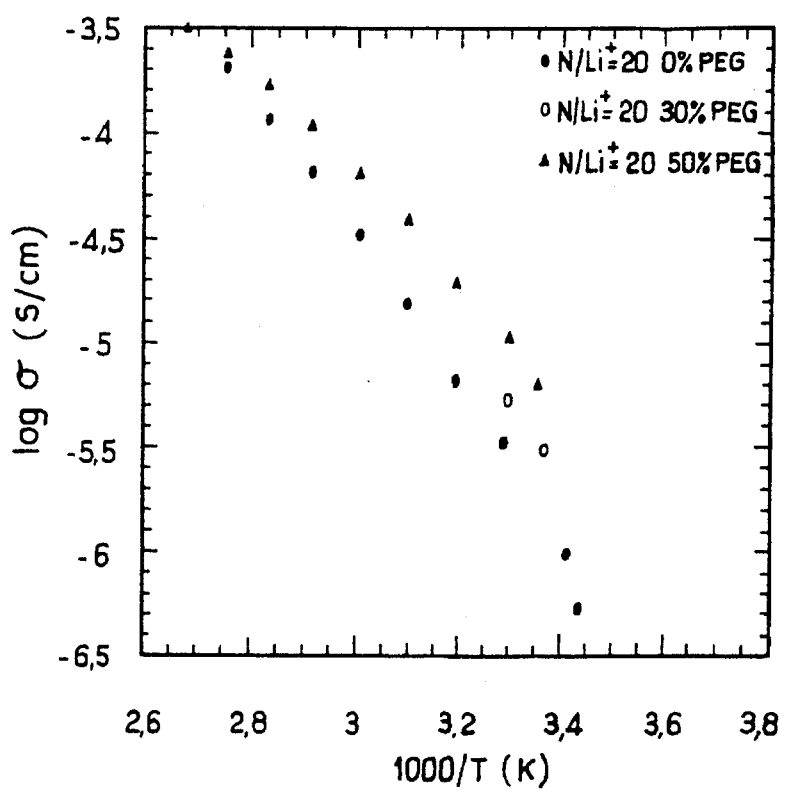

Furthermore, the graphs of FIGS. 5 and 6, corresponding to Examples 9 to 12, make it possible to show, for an identical $N/Li^+$ ratio, the influence of the proportion of PEG upon the ion conductivity, modest or not depending upon the temperature of the material.

It can be seen in particular that, with a material of the type of Example 8, that is to say having an $N/Li^+$ ratio of 8 and a proportion of PEG of 50%, an ion conductivity of at least $10^{-4}$ ohm$^{-1}$.cm$^{-1}$ at a temperature of 60° C. is obtained, that is to say an excellent ion conductivity at a moderate temperature, as well as a conductivity of at least $10^{-5}$ ohm$^{-1}$.cm$^{-1}$ at ambient temperature.

The use of a plasticizer for the BPEI, and notably of PEG, therefore favors very considerably the ion conductivity of the material, probably by simultaneously considerably reducing its glass transition temperature and by itself participating in the solvation of the $Li^+$ cations.

It should be noted, however, that excessively large proportions of PEG are not desirable because then the mechanical behavior of the material is strongly degraded and it is no longer film-forming. This is contrary to the objects of this invention, one of which is to develop an absolutely solid and manageable electrolyte.

The solid solutions prepared according to this invention by reason of their ion conductivity in a range of "reasonable" temperatures and the ease with which they can be handled and processed, find applications as electrolytes in all electrochemical generator devices.

One particular application of this invention concerns their use as electrolyte in electrochromic glazing panes, which can be produced in the following manner. Between two glass substrates there are stacked, in succession, a transparent electrically conducting film, an electrode of electrochromic material with reversible insertion of $Li^+$, an electrolyte as described in the present invention, a counter-electrode optionally having electrochromic properties, and again a transparent electrically conducting film similar to the first.

The electrically conducting films are, for example, of indium oxide doped with tin. The electrode may be composed of tungsten oxide $WO_3$.

The counter-electrode may, preferably, be based upon hydroxylated nickel oxide or oxides, as described in French Patent Application FR 2,639,441, or based upon prelithiated nickel oxides (mixed oxides of nickel and lithium). These oxides may, in addition, be "doped" notably by the presence of metals such as cobalt, manganese or the rare earths. They may also be based upon iridium oxide, as described in FR 2,629,222.

Obviously, numerous modifications and variations of the present invention are possible in light of the above teachings. It is therefore to be understood that within the scope of the appended claims, the invention may be practiced otherwise than as specifically described herein.

What is claimed as New and Desired to be Secured by Letters Patent of the United States is:

1. A solid ion conductor material, comprising:
   a branched polyethylene imine polymer containing repeating ethylene imine monomer units, a polyethylene glycol plasticizer for said polymer containing repeating oxygen-containing monomer units, and a lithium salt, wherein the ratio $N/Li^+$ of the number of nitrogen atoms N contained in said polymer to the number of lithium cations $Li^+$ originating from said salt is from 6 to 10, the ratio of the number of oxygen-containing monomer units of said plasticizer to the number of said oxygen-containing monomer units plus said ethylene imine monomer units is 20 to 60%, and said solid ion conductor material has a conductivity of at least $10^{-5}$ ohm$^{-1}$ cm$^{-1}$ at 25° C.

2. The material of claim 1, wherein the $N/Li^+$ ratio is about 8.

3. The material of claim 1, wherein said polyethylene glycol has a molecular weight of less than 600.

4. The material of claim 3, wherein said polyethylene glycol has a molecular weight of about 400.

5. The material of claim 2, wherein the ratio of oxygen-containing monomer units to the total of oxygen-containing monomer units plus imine monomer units is about 50%.

6. The material of claim 1, wherein said polyethylene imine polymer has an average molecular weight of 50,000–60,000 and the ratio of primary/secondary/tertiary nitrogen atoms in said polymer is between 1/2/1 and 1/1.33/1.

7. The material of claim 1, wherein the anion of said lithium salt is selected from the group consisting of $CF_3SO_3^-$, $SCN^-$, $ClO_4^-$, and $BF_4^-$.

8. In an electrochromic device having an electrode formed of an electrochromic material capable of reversible insertion of lithium cations, a counterelectrode and an electrolyte between said electrode and said counterelectrode, the improvement comprising:
   a solid ion conductor material, comprising a branched polyethylene imine polymer containing repeating ethylene imine monomer units, a polyethylene glycol plasticizer for said polymer containing repeating oxygen-containing monomer units, and a lithium salt, wherein the ratio $N/Li^+$ of the number of nitrogen atoms N contained in said polymer to the number of lithium cations $Li^+$ originating from said salt is from 6 to 10, the ratio of the number of oxygen-containing monomer units of said plasticizer to the number of said oxygen-containing monomer units plus said ethylene imine monomer units is 20 to 60%, and said solid ion conductor material has a conductivity of at least $10^{-5}$ ohm$^{-1}$ cm$^{-1}$ at 25° C.

9. The device of claim 8, wherein the $N/Li^+$ ratio is about 8.

10. The device of claim 8, wherein said polyethylene glycol has a molecular weight of less than 600.

11. The device of claim 10, wherein said polyethylene glycol has a molecular weight of about 400.

12. The device of claim 9, wherein the ratio of oxygen-containing monomer units to the total of oxygen-containing monomer units plus imine monomer units is about 50%.

13. The device of claim 8, wherein said polyethylene imine polymer has an average molecular weight of 50,000–60,000 and the ratio of primary/secondary/tertiary nitrogen atoms in said polymer is between 1/2/1 and 1/1.33/1.

14. The device of claim 8, wherein the anion of said lithium salt is selected from the group consisting of $CF_3SO_3^-$, $SCN^-$, $ClO_4^-$, and $BF_4^-$.

15. The device of claim 8, wherein said device is an electrochromic glazing.

* * * * *